F. L. HILL.
PROCESS OF IMITATING ONYX OR MARBLE ON GLASS.
APPLICATION FILED SEPT. 19, 1910.

993,993.

Patented May 30, 1911

Witnesses
O. B. Hopkins

Inventor
Frank L. Hill
by his Attorneys

UNITED STATES PATENT OFFICE.

FRANK L. HILL, OF DAYTON, KENTUCKY.

PROCESS OF IMITATING ONYX OR MARBLE ON GLASS.

993,993.  Specification of Letters Patent.  Patented May 30, 1911.

Application filed September 19, 1910. Serial No. 582,705.

*To all whom it may concern:*

Be it known that I, FRANK L. HILL, a citizen of the United States, residing at Dayton, in the county of Campbell and State of Kentucky, have invented certain new and useful Improvements in Processes of Imitating Onyx and Marble on Glass; and I do declare the following to be a full, clear, and exact description of the invention, such as will enable others skilled in the art to which it appertains to make and use the same.

My invention relates to a process of imitating onyx and marble on glass.

The object of the invention is to produce an imitation of onyx or marble by applying to the back of plate or other transparent glass, any desired combination of colors in the manner hereinafter described and afterward specifically claimed.

Figure 1:
Figure 3:
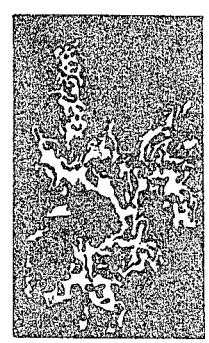
Figure 2:
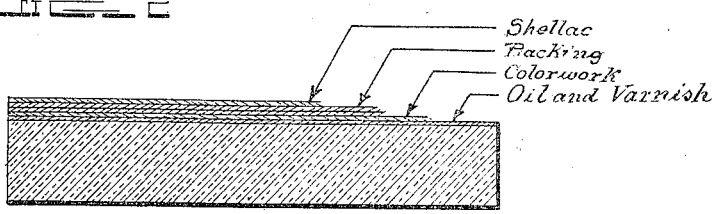

In the accompanying drawings: Figure 1 is a front view of a glass panel showing the application of my improved process for imitating onyx; Fig. 2 is a cross sectional view of the same; Fig. 3 is a front view of a glass panel showing the application of my improved process for imitating verd marble.

In carrying out the invention I provide a piece of glass of the desired size and shape, said glass being preferably though not necessarily plate glass. On the back of the glass, which has been thoroughly cleaned, is first applied a coating of linseed oil and varnish mixed in about equal parts and to which is added a little Japan drier and in cool temperatures, a little turpentine may be added. After thus coating the glass a coating of colors is applied by flowing it upon the varnish coating while still wet.

In preparing the color coat the desired colors are selected and mixed in the same composition of materials which form the first coat, it being understood that the colors are only mixed sufficiently to obtain the desired variegation or onyx effect and not to make an entirely opaque mixture. When the color has been thus mixed and is applied to the first coat before the latter has dried, the color coat will soften and flow onto the first coat which produces a better transparency than if applied directly to the glass or upon a dry coating. After the foregoing steps of the process are completed, one or more coats of paint are applied to the semi-transparent color coating to form a color backing, after which a finishing coat of shellac is applied which forms a substantial backing or protection for the color work.

An imitation of onyx or marble applied to glass in the manner described will have the deep and transparent effect of polished onyx or marble. By the application of the color coating in the manner described the colors are free from atmospheric conditions and are protected against marring or scratching and permit the outer surface of the glass to be kept clean without danger of injuring the color work which will, therefore last indefinitely.

Glass prepared in accordance with this invention may be employed wherever onyx or marble is used, such for instance as on walls, and similar surfaces, and in connection with bath room fixtures, bar fixtures, soda fountains, store counters and the like.

Having thus described my invention what I claim as new is:—

The hereindescribed process of imitating onyx or marble on glass which consists in preparing a mixture of oil and varnish in substantially equal parts, applying a coating of this transparent mixture to a previously cleaned plate of transparent glass, mixing suitable colors in a portion of the oil and varnish mixture to a sufficient extent to produce a variegated effect but not to produce an entirely opaque mixture, applying a coat of this variegated semi-transparent mixture upon the oil and varnish coat while the latter is still wet, applying a color backing of coats of paint upon the variegated coat after the latter is dry, and finally applying a protecting and finishing coating upon said backing.

In testimony whereof I have hereunto set my hand in presence of two subscribing witnesses.

FRANK L. HILL.

Witnesses:
  WALTER FORSTER.
  LEILA MARSH.